(12) United States Patent
Gostev et al.

(10) Patent No.: US 9,154,517 B2
(45) Date of Patent: *Oct. 6, 2015

(54) SYSTEM AND METHOD FOR PREVENTING SPREAD OF MALWARE IN PEER-TO-PEER NETWORK

(75) Inventors: Alexander A. Gostev, Moscow (RU);
Andrey V. Nikishin, Moscow (RU); Igor I. Soumenkov, Moscow (RU); Roman V. Rybalko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 678 days.

This patent is subject to a terminal disclaimer.

(21) Appl. No.: 13/527,651

(22) Filed: Jun. 20, 2012

(65) Prior Publication Data

US 2013/0340080 A1 Dec. 19, 2013

Related U.S. Application Data

(63) Continuation-in-part of application No. 13/527,561, filed on Jun. 19, 2012, now Pat. No. 8,484,347.

(51) Int. Cl.
*G06F 11/30* (2006.01)
*H04L 29/06* (2006.01)
*H04L 29/08* (2006.01)

(52) U.S. Cl.
CPC .......... *H04L 63/145* (2013.01); *H04L 63/1433* (2013.01); *H04L 67/104* (2013.01)

(58) Field of Classification Search
CPC .. H04L 63/145; H04L 67/104; H04L 63/1433
USPC .......... 709/223–225, 229; 707/952, 697–699; 713/179, 180, 182, 185, 188, 168, 169, 713/171, 176
See application file for complete search history.

(56) References Cited

U.S. PATENT DOCUMENTS

| | | | |
|---|---|---|---|
| 6,993,660 B1 | 1/2006 | Libenzi et al. | |
| 7,203,753 B2 * | 4/2007 | Yeager et al. | 709/225 |
| 7,222,187 B2 * | 5/2007 | Yeager et al. | 709/237 |
| 7,275,102 B2 * | 9/2007 | Yeager et al. | 709/224 |
| 7,308,496 B2 * | 12/2007 | Yeager et al. | 709/224 |
| 7,328,349 B2 | 2/2008 | Milliken | |
| 7,383,433 B2 * | 6/2008 | Yeager et al. | 713/157 |

(Continued)

FOREIGN PATENT DOCUMENTS

| | | |
|---|---|---|
| EP | 2020798 A3 | 4/2009 |
| JP | 2006178748 | 7/2006 |

*Primary Examiner* — Kenneth R Coulter
(74) *Attorney, Agent, or Firm* — Arent Fox LLP; Michael Fainberg

(57) ABSTRACT

Disclosed are systems, methods and computer program products for detecting and preventing spread of malware in a peer-to-peer (P2P) network. The system includes a P2P server receiving from a peer client computer a request for a metadata object and determining if the requested metadata object is associated with one of a verified clean data object, a verified malicious data, or an unverified data object. If the requested metadata object is associated with a verified clean data object, transmitting the requested metadata object to the peer client computer. If the requested metadata object is associated with an unverified data object, determining if the peer client computer has an antivirus software for testing the unverified data object for malware. If the peer client computer has an antivirus software, transmitting to the peer client computer the requested metadata object, otherwise denying client' request.

18 Claims, 7 Drawing Sheets

(56) References Cited

U.S. PATENT DOCUMENTS

| | | |
|---|---|---|
| 7,426,574 B2 | 9/2008 | Liao |
| 7,496,956 B1 | 2/2009 | Viljoen et al. |
| 7,877,801 B2 | 1/2011 | Repasi et al. |
| 8,150,987 B2 * | 4/2012 | Murphy et al. ............... 709/230 |
| 8,204,915 B2 * | 6/2012 | Dolganow et al. ............ 707/803 |
| 8,484,347 B1 * | 7/2013 | Gostev et al. ................ 709/225 |
| 8,862,665 B2 * | 10/2014 | Murphy et al. ............... 709/204 |
| 2003/0070070 A1 * | 4/2003 | Yeager et al. ................. 713/157 |
| 2003/0131280 A1 | 7/2003 | Gittins et al. |
| 2005/0021994 A1 | 1/2005 | Barton et al. |
| 2005/0086300 A1 * | 4/2005 | Yeager et al. ................. 709/204 |
| 2007/0162975 A1 | 7/2007 | Overton et al. |
| 2007/0244894 A1 | 10/2007 | St. Jacques |
| 2008/0147612 A1 | 6/2008 | Gryaznov |
| 2009/0119681 A1 | 5/2009 | Bhogal et al. |
| 2010/0211608 A1 * | 8/2010 | Dolganow et al. ............ 707/803 |
| 2010/0211789 A1 * | 8/2010 | Dolganow et al. ............ 713/171 |
| 2012/0166542 A1 * | 6/2012 | Murphy et al. ............... 709/204 |

* cited by examiner

SYSTEM AND METHOD FOR PREVENTING SPREAD OF MALWARE IN PEER-TO-PEER NETWORK

CROSS-REFERENCE TO RELATED APPLICATIONS

This application is a continuation-in-part of U.S. patent application Ser. No 13/527,561 filed on Jun. 19, 2012, and issued as U.S. Pat. No. 8,484,347 on Jul. 9, 2013, the entire contents of which are incorporated by reference herein.

FIELD OF TECHNOLOGY

This disclosure relates generally to the field of computer security and, particularly, to systems, methods and computer program products for detection and prevention of spread of malware in peer-to-peer (P2P) network.

BACKGROUND

The popularity of peer-to-peer (P2P) networks has grown significantly due to ever-increasing demand for digital content, such as data file, movies, music, videogames and software applications. P2P networks allow peer client computers to share content with each other directly rather than through a central server. BitComet® and µTorrent™ are examples of popular P2P networking applications. P2P networks usually use BitTorrent® protocol or other type of peering protocol for communication. These protocols allow a peer client computer to send/receive requests for data objects, such as files, to/from other peer client computers in the same P2P network. The requestor peer client computer then downloads the requested data objects in pieces from multiple source peer client computers and reassembles the data object. This architecture of the P2P networks provides enhanced scalability and service robustness.

However, unregulated nature of P2P networks and the ever-growing number of the users makes these networks very vulnerable to the spread of malware, such as viruses, worms, Trojans, spyware, etc. The malware may be planted into file archives containing necessary network information or inserted into popular data objects, such as free software applications, which are shared among peer client computers. Since not all peer client computers have antivirus applications and those that do may not be updated with the latest antivirus definitions, the P2P network is extremely vulnerable to spread of malware. Accordingly, there is an urgent need to detect and prevent spread of malware in the P2P networks.

SUMMARY

Disclosed are systems, methods and computer program products for detecting and preventing spread of malware in a P2P network. In one example embodiment, a system includes a P2P network server that stores metadata objects containing information about various data objects available for download from the peer client computers. A metadata object includes information used to locate peer client computers that can provide the associated data object. To that end, the server is configured to receiving from a peer client computer a request for a metadata object. The server determines if the requested metadata object is associated with one of a verified clean data object, a verified malicious data or an unverified data object. If the requested metadata object is associated with a verified clean data object, the server transmits the requested metadata object to the peer client computer. If the requested metadata object is associated with an unverified data object, the server determines if the peer client computer has an antivirus software for testing the unverified data object for malware when the data object is downloaded from the P2P network. If the peer client computer has an antivirus software, the server transmits to the peer client computer the requested metadata object. If the peer client computer does not have an antivirus software, the server denies request to provide the requested metadata object to the peer client computer. Therefore, by denying access to unverified data objects to unprotected peer client computers, the system prevents distribution of malware and potential malware on the P2P network.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF DRAWINGS

The accompanying drawings, which are incorporated into and constitute a part of this specification, illustrate one or more example embodiments of the invention and, together with the detailed description serve to explain the principles and implementations of the embodiments.

In the drawings.

DETAILED DESCRIPTION OF EXAMPLE EMBODIMENTS

Example embodiments are described herein in the context of systems, methods and computer program products for malware detection in peer-to-peer (P2P) computer networks. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

In one example embodiment, the system for detection of malware in a P2P network includes a P2P network server and a plurality of peer client PCs, which exchange data using a P2P network protocol. All peer clients that perform data exchange in the P2P network can be divided into two groups: first group of computers have antivirus engine, which can be implemented as hardware devices or software applications used for detection of malicious objects; and the second group of computers that do not have any such antivirus engines. The malicious objects include software that performs unauthorized destruction, blocking, modification, or copying of data that can cause problems in the operation of the computer or computer network or other undesirable consequences. Malicious objects may include, but not limited to computer viruses, worms, Trojans, hacking tools, polymorphic malicious code, etc.

Figure 1:
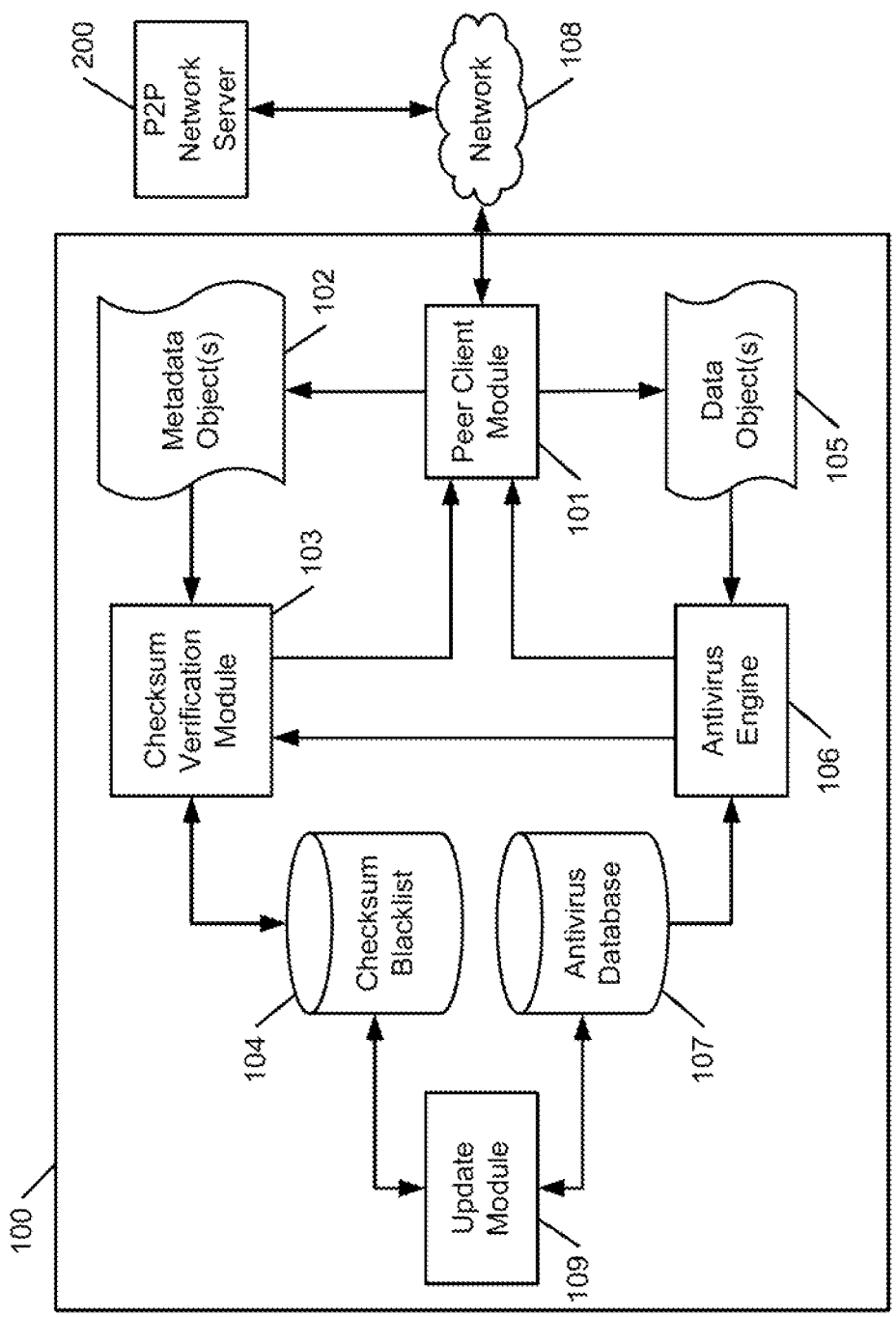
FIG. 1 shows a schematic diagram of a client-side system for detection of malware in a P2P networks according to one example embodiment.

FIG. 1 shows one example embodiment of a malware detection system in a P2P network. The malware detection system 100 can be deployed on a personal computer (PC), a server computer, a network router, a notebook, a tablet, a smart phone, or other type of programmable electronic device connected to a network 108, such as the Internet, or other type of wired, wireless, or cellular network. As shown, system 100 includes a peer client module 101, which allows the system 100 to communicate with one or more P2P networks, e.g., ED2K (eDonkey2000), Overnet, BitTorrent, etc., as well as other networks that use encryption of user addresses and data for anonymity, e.g., P2P, to download various data objects 105, such as audio and movie files, videogames, applications, etc. Particularly, to download a data object 105 from the P2P network, the peer client 101 may be configured to connect to a P2P server 200, obtain a metadata object 102 associated with the data object 105 and download the data object 105 from other peer client(s) in the P2P network.

The metadata associated with the data object 105 may be represented either as metadata file or a metadata link, e.g., a Uniform Resource Locator (URL). Some P2P networks use metadata files that contain, at least, a checksum of the data object 105, as well as address of the resource on the Internet where the data object can be found (or the P2P network server 200), general information about the data objects 105 and other information. Other P2P networks use a metadata link that includes parameters necessary to uniquely identify the data object 105 without binding the data object 105 to the metadata file and to a resource on the Internet that stores metadata files. The metadata link may include at least a checksum of the data object 105, as well as additional information, such as name of the object, its size (e.g., in bytes), keywords used for searching the data object 105 on the P2P network, and other information. A metadata link can be represented as follows: magnet:?xI=10826029 & xt=urn: tree: tiger: 7N5OAMRNGMSSEUE3ORHOKWN4WWI Q5X4EBOOTLJY. When the link is activated, the peer client module 101 will begin downloading the corresponding data object.

Regardless of the presentation of the metadata (i.e., file or link), the metadata typically contains a checksum, which uniquely characterizes the associated data object. In one example embodiment, checksum may include a secure hash of the data object, such as a hash generated using a cryptographic hash function MD5, MD4, SHA1, SHA256, CRC32 or other. If the peer client 101 downloads several data objects at the same time, then associated metadata will contain checksums for each downloaded data object. In the following description of example embodiments of the system, a metadata file will be used for convenience. However, a metadata link may be readily used by the system 100 in alternative embodiments.

The system 100 further includes a checksums verification module 103 which is configured to identify and extract from the metadata object 102 one or more checksums associated with the requested data object(s) 105. Module 103 then verifies each checksum by comparing it with checksums stored in a checksum blacklist 104. Checksum blacklist 104 includes a list of checksums of known malicious data objects. If checksum verification module 103 determines that the checksum of data object 105 is found in the blacklist 104, the data object 105 is deemed malicious and the checksum verification module 103 may prohibit download of the data object 105 on system 100. In addition, the peer client module 101 may notify the P2P server 200 that a malicious data object 105 has been detected and provide (or identify) the metadata object 102 associated with the malicious object 105. The P2P server 200 may in response to this notification move the metadata object associated with the malicious data object from an unverified metadata database (module 202 in FIG. 2) to a malware metadata database (module 205 in FIG. 2); thereby, preventing spread of the malicious data object to other computers in the P2P network. However, if the checksum of the object 105 was not found in the blacklist 104, the verification module 103 allows download of the data object 105.

After completion of the download of the data object 105, the data object may be scanned for viruses by an antivirus engine 106. The object may be scanned using one or more different malware detection techniques, such as signature matching, heuristic and behavioral analysis, and other methods. Signature matching is based on a comparison of bytecode of the data object with byte codes (i.e., signatures) of known malicious objects. Heuristic analysis uses analytical system that applies flexibly defined algorithms defined using, for example, fuzzy logic rules. Behavioral analysis is based on monitoring events of object's execution in a virtual environment and identification of series of events that may cause harm to this environment.

In one example embodiment, the antivirus engine 106 may use antivirus database 107 which may contains data used for detection of malicious objects. For example, the antivirus database may contain malware signatures, heuristic analysis algorithms, malware behavior templates, etc. As explained above, the signatures of malicious objects are sequences of bits that are compared with the code of the analyzed object. If there is a match, the analyzed object is declared malicious. The behavior templates, in turn, contain information about the possible actions of potentially dangerous objects, such as a call to system functions, access to the register, etc. If the behavior of the analyzed data object matches or substantially corresponds to one of the malware behavior templates, the object is declared malicious.

If the antivirus engine 106 identified downloaded data object 105 as malicious, the antivirus engine 106 may prohibit execution of this data object 105 on system 100. In addition, the antivirus engine 106 may instruct the peer client module 101 to notify the P2P server 200 that a malicious data object 105 has been detected and provide (or identify) the metadata object 102 associated with the malicious object 105. The P2P server 200 may in response to this notification move the metadata object associated with the malicious data object from an unverified metadata database (module 202 in FIG. 2) to a malware metadata database (module 205 in FIG. 2); thereby, preventing spread of the malicious data object to other computers in the P2P network. Also, the antivirus engine 106 may instruct the checksum verification module 103 to add the checksum of the malicious object 105 to the checksum blacklist 104.

In one example embodiment, the antivirus engine 106 may perform the antivirus scan on a loaded portion of the data object 105, before the entire object is downloaded. And if the scanned portion of the object is determined to be malicious, the antivirus engine 106 may stop download of the object before it is completed. The P2P server 200 is then notified about detection of a malicious object and a checksum of the object is added to the database 104.

In one example embodiment, the system 100 further includes an update module 109, which is configured to update the checksum blacklist 104 and antivirus database 107 based on information provided by a remote update server (not shown) hosted by an antivirus software developer, such as Kaspersky Lab, Symantec, Trend Micro or others. In addition, the update module 109 is configured to send a checksum of a malicious object detected by the antivirus engine 106 to the update server, which in turn may automatically send this checksum of the newly detected malicious object to update modules of other peer systems 100 using, for example, PUSH technology, thereby preventing spread of malware in the P2P network.

Figure 2:
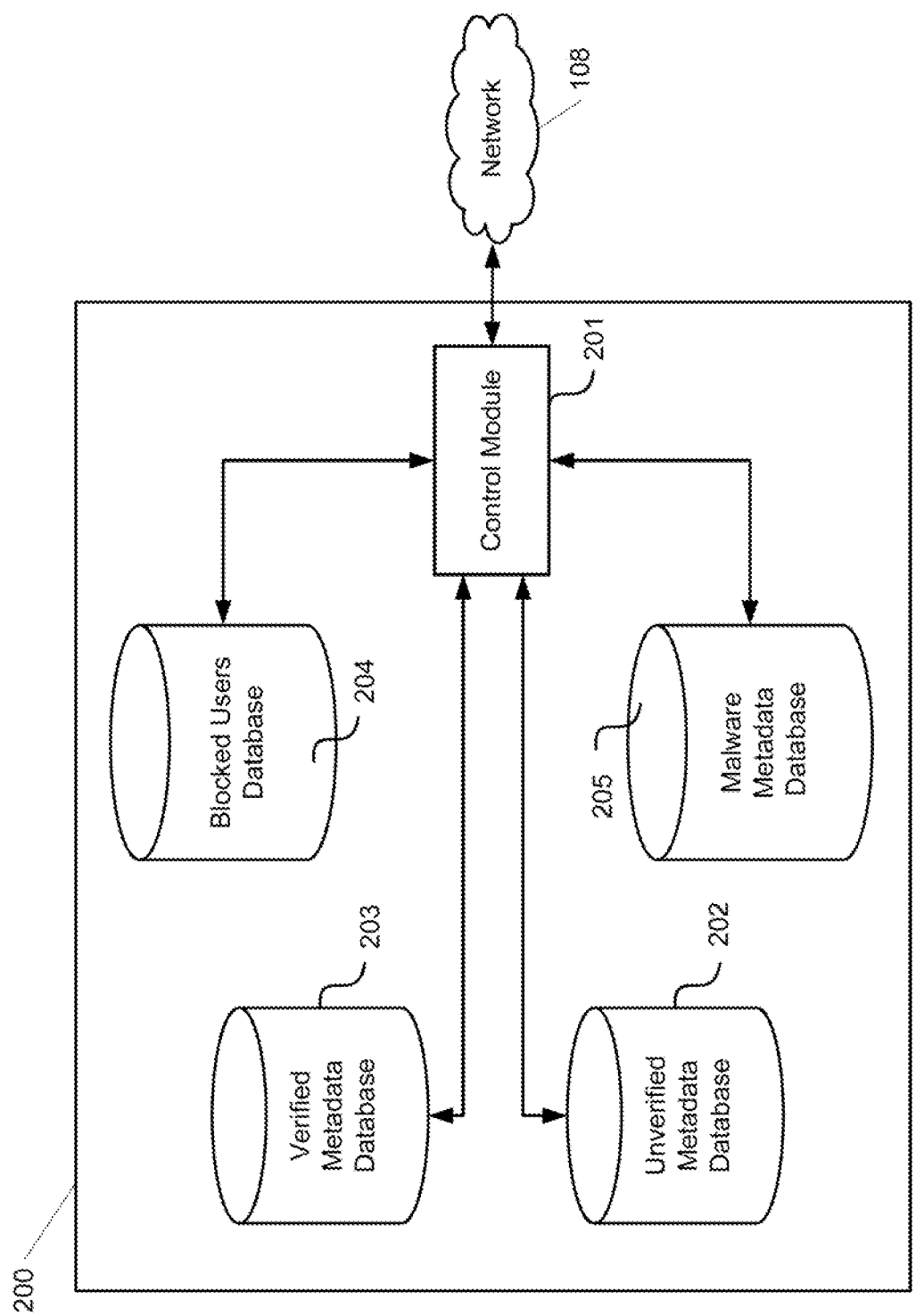
FIG. 2 shows a schematic diagram of a server-side system for detection of malware in the P2P network according to one example embodiment.

There are generally two different types of P2P networks: centralized and decentralized. Centralized networks, as opposed to decentralized networks, typically include a P2P network server, such as server 200. FIG. 2 shows one example embodiment of the P2P network server 200. Server 200 is configured to control the operation of the P2P network, control data exchange between peer computer systems 100, and prevent the spread of malware in the P2P networks. In order to perform these tasks, the P2P server 200 includes, but is not limited to, a control module 201, an unverified metadata database 202, a verified metadata database 203, a blocked user database 204 and a malware metadata database 205.

In one example embodiment, all metadata objects stored on the P2P server 200 may be divided into three groups. The first group includes metadata objects associated with known clean data objects (e.g., data objects not containing malware). This group of metadata objects is stored in the verified metadata database 203. In one example embodiment, these metadata objects are made available for download by the P2P server 200 to all peer client computer systems 100, regardless of whether these systems have antivirus engines 106 or not.

The second group of metadata objects includes metadata objects associated with unverified data objects (e.g., data objects that were not scanned for presence of malware). These metadata objects are stored in the unverified metadata database 202. This group may include metadata objects that were added to the database 202 as a result of registration on the P2P server 200 of a new data object made available for download by a peer client computer.

The third group of metadata objects includes the metadata objects associated with known malware, which was identified as such through antivirus scanning. These metadata objects are stored in the malware metadata database 205. These metadata objects are not available for download when requested from the network server 200 to ensure that the associated malicious objects are not spread through the P2P network.

The emergence of a new metadata object indicates that there are new data object, associated with the new metadata object, which is available for download from one of the peer client computers. This new data object represents a potential danger because it can contain malware. For this reason, and particularly because of the possible risks associated with the new data object, its associated metadata object may automatically be stored in the unverified metadata database 202, which limits access to the metadata object and accordingly to the associated data object. At the same, new metadata objects associated with known malicious objects may be filtered out by control module 201 through the comparison with metadata objects of known malware stored in the malware metadata database 205.

In one example embodiment, unverified metadata objects stored in database 202 have limited access, which is permitted only to those peer computer systems that have the ability to analyze downloaded data objects, associated with the unverified metadata objects, for the presence of malware. Particularly, when a peer computer requests an unverified metadata object from the P2P network server 200, the control module 201 is configured to check whether this peer computer has a malware detection system 100 or similar antivirus software deployed thereon for testing the requested data object for presence of malware.

Therefore, only peer computer systems that have malware detection system 100 or similar antivirus software deployed thereon have the right to download unverified metadata objects and the associated data object provided that immediately after downloading such metadata object, the peer computer system will analyze the downloaded object using malware detection systems 100 for presence of malware and report results of the antivirus analysis to the P2P network server 200. The control module 201 receives report with the results of the antivirus analysis. If the report indicates that the previously unverified data object is clean (i.e., contains no malware), control module 201 moves the associated metadata object from the unverified metadata database 202 to the verified metadata database 203. Once a metadata object is moved to the database 203, this metadata object and the associated data object become available for download to all peer computer systems in the P2P network, even those computers that do not have a malware detection system 100 or any other antivirus software.

However, if the report from the malware detection system 100 indicates that the downloaded data object is infected with malware (i.e., contains malicious code), the control unit 201 moves the associated metadata object to the from the unverified metadata database 202 to the malware metadata database 205. Once a metadata object is moved to the database 205, this metadata object and the associated data object are no longer available for download on the P2P network. This prevents further spread of malware on the P2P network.

Exchange of data on the P2P network can be organized in networks of different sizes, such as local area networks (LAN) and wide area networks (WAN). In the networks where it is possible to determine the IP and MAC addresses of computer systems, the P2P network server 200 may also store information about blocked user in a blocked users database 204. In this embodiment, the system control module 201 receives the IP addresses and/or MAC addresses of peer computers in the local area network, using, for example, ARP request, which provide new unverified metadata objects to the P2P network server 200. Further, if it is determined as a result of the antivirus analysis performed by another peer computers with malware detection system 100 that the new unverified metadata object is associated with malware, the control module 201 may add to the blocked users database 204 the IP and/or MAC addresses of the peer computer that provided the metadata objected associated with malware. In this manner, any further attempts by this peer computer to distribute the new metadata objects will be stopped by the control module 201 by checking IP and/or MAC addresses of that peer computer with information about blocked users in the database 204.

Figure 3A:
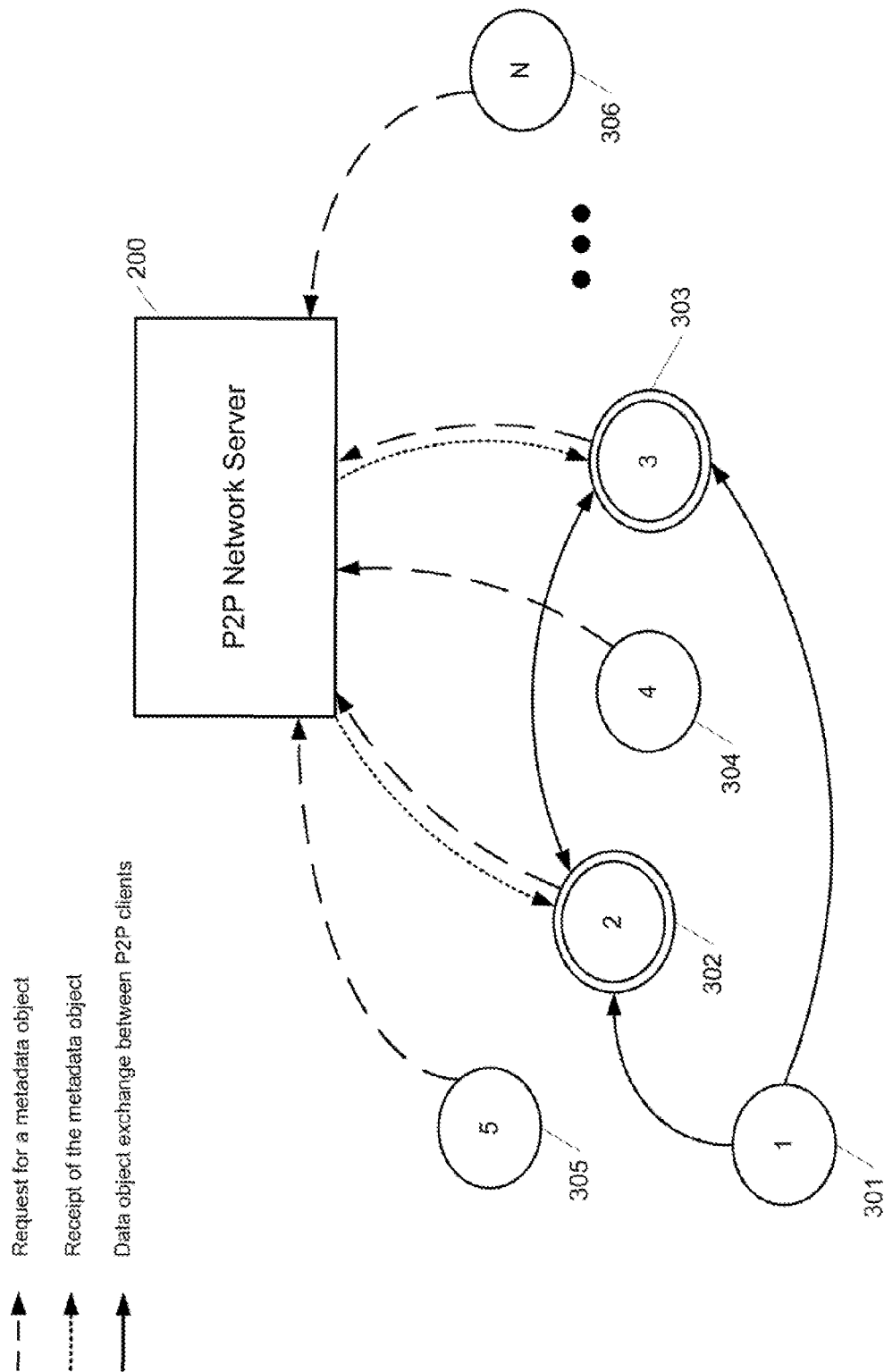
FIGS. 3A-3B show schematic diagrams of interaction of components of the system for preventing spread of malware in the P2P network according to one example embodiment.

FIG. 3A shows a diagram of example interaction of computers in a P2P network in the event of detection of a new malware data object in the P2P network. As shown, the network includes a P2P server 200, which control access to the metadata objects stored thereon, and a plurality of peer client computers 301-306. The client computers may be separated into two groups: those computers with malware detection systems installed thereon (e.g., 302, 303), and those without malware detection systems (e.g., 301, 304-306). Before any client computer can provide, for download on the P2P network, a new data object (e.g., a data object which does not have an associated metadata object in the verified metadata database 203), it is necessary to create and store on the P2P server 200 a metadata object that describes the new data object. Suppose client computer 301 provides to the server 200 a new metadata object that describes a new data object available for download from the client computer 301. The control module 201 will first check if the new metadata object is found in the malware metadata database 205. If the new metadata object is found in database 205, the client computer 301 will not be allowed to distribute the associated malicious data object on the P2P network. If the new metadata object is not in database 205, the metadata object is placed in the unverified metadata database 202. This metadata object has a limited access, which makes it available for download only to client computers that have malware detection system, such as system 100, or another type of antivirus application installed thereon. In this case, when any of client computers 302-306 requests this metadata object from server 200 in order to download the associated data object from computer 301, the control module 201 will determine whether these client computers have a malware detection system installed thereon, such as system 100. In the described example, only client computers 302 and 303 will receive access to the new metadata object, as they are capable of testing the associated new data object, once it's downloaded from computer 301, for presence of malware using the malware detection system 100 deployed thereon or another type of antivirus application.

For example, when a client computer 302 receives the requested new metadata object from server 200, it can download the associated data object from client computer 301. After downloading the data object, client computer 302 can perform antivirus scan of the downloaded data object using malware detection system 100 or another antivirus software deployed thereon. The client computer 302 then sends to server 200 a status report indicating whether the tested new data object is clean or malicious. Alternatively, the client computer 302 may send to the server 200 results of the antivirus analysis and let the server 200 determine, based on the results of antivirus scan, whether the new data object is clean or malicious. In either case, if it is determined that the new data object is malicious, the control module 201 moves the associated metadata object from the unverified metadata database 202 to the malware metadata database 205, thereby preventing distribution of the associated data object on the P2P network. In addition, the control module 201 may notify the client computer 301, which provides the malicious data object, and/or the client computer 302 which downloaded and tested this data object for presence of malware, to delete or at least to quarantine the malicious data object from its memory to avoid spreading of malware on the network.

On the client side, after client computer 302 identifies a new malicious data object using antivirus engine 106 or by the notification from server 200, the checksum validation module 103 may place the checksum of the new malicious data object in the checksum blacklist 104. During next update of the checksum blacklist 104, the update module 109 will add the checksum of the new malicious data object to the malicious checksum database on the central antivirus server (not shown), which in turn, will update the checksum blacklists 104 on all other client computers in the P2P network that deploy malware detection system 100 or another antivirus application. Thus, any further attempts to load the new malicious data object on any client computer in the P2P network will be automatically blocked by the system 100 deployed on that computer by verifying whether the checksum of the requested malicious data object, retrieved from the associated metadata object, is found in its local checksum blacklist 104.

Figure 3B:
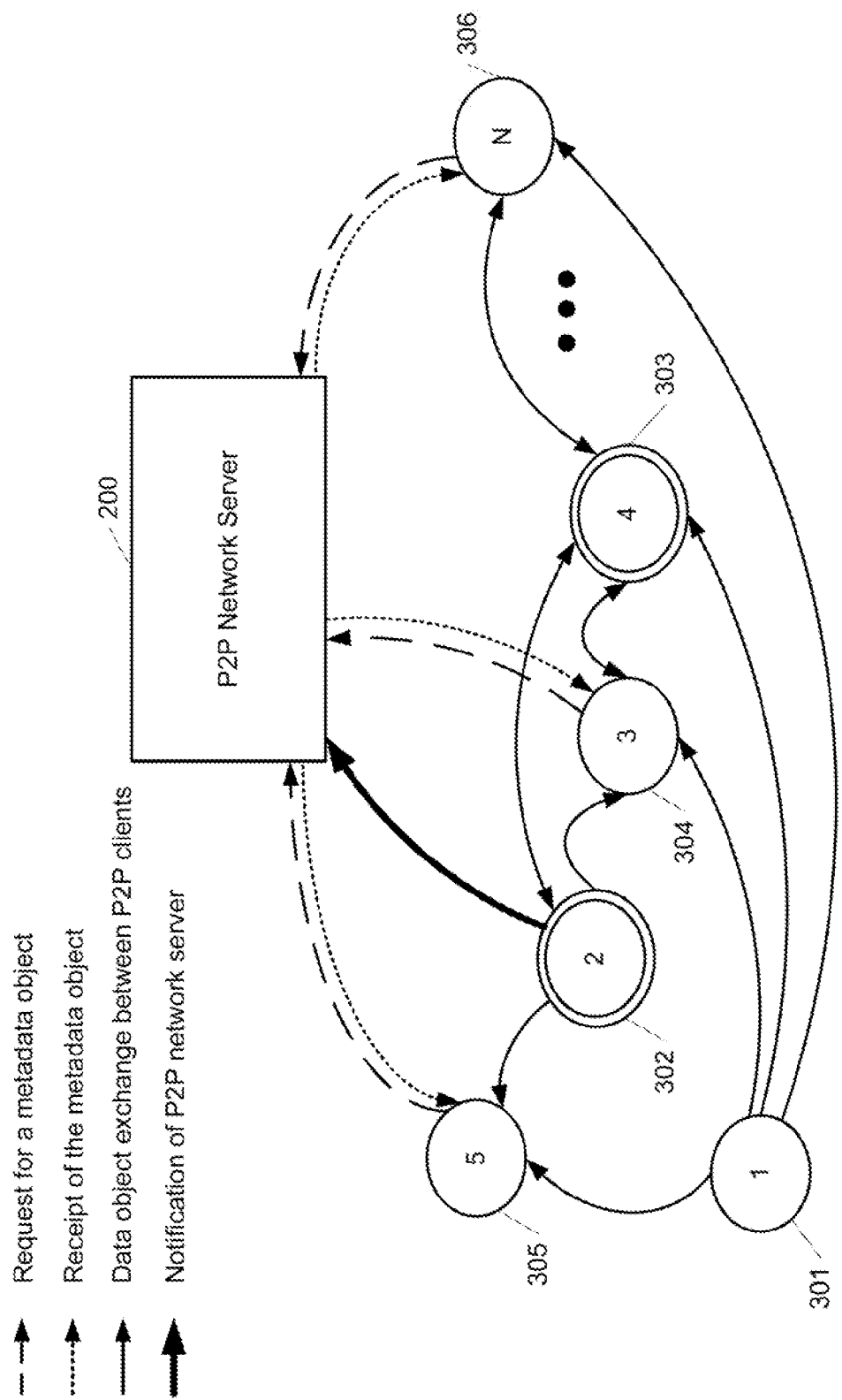

FIG. 3B shows a diagram of example interaction of computers in a P2P network during exchange of a clean data object. For example, a client computer 302 may download from a client computer 303 a new unverified data object. After downloading, client computer 302 may perform antivirus check on the data object using, for example, antivirus engine 106. If the object is found to be clean (e.g., does not contain any malware), the client computer 302 may notify the P2P server 200 that new data object is clean. In response, the control module 201 may add metadata object associated with the new clean data object into the verified metadata database 203. In this manner, the new verified clean data object becomes available to all client computers in the P2P network, including client computers 301 and 304-306, which do not have a malware detection system 100 or other antivirus software that can be used to independently test downloaded data objects for presence of malware.

Figure 4A:
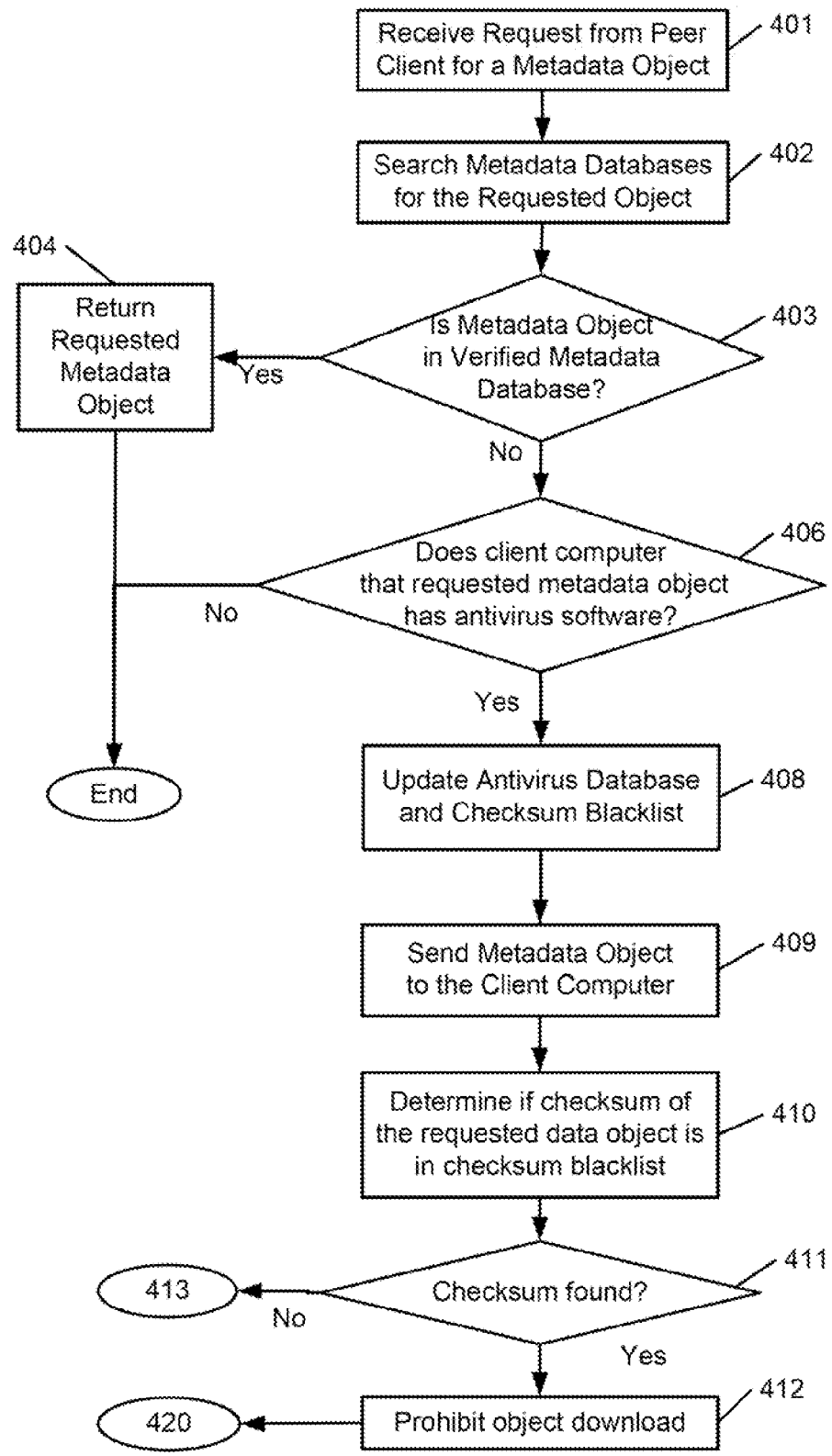
FIGS. 4A-4B show a method for detecting and preventing spread of malware in the P2P network according to one example embodiment.
Figure 4B:
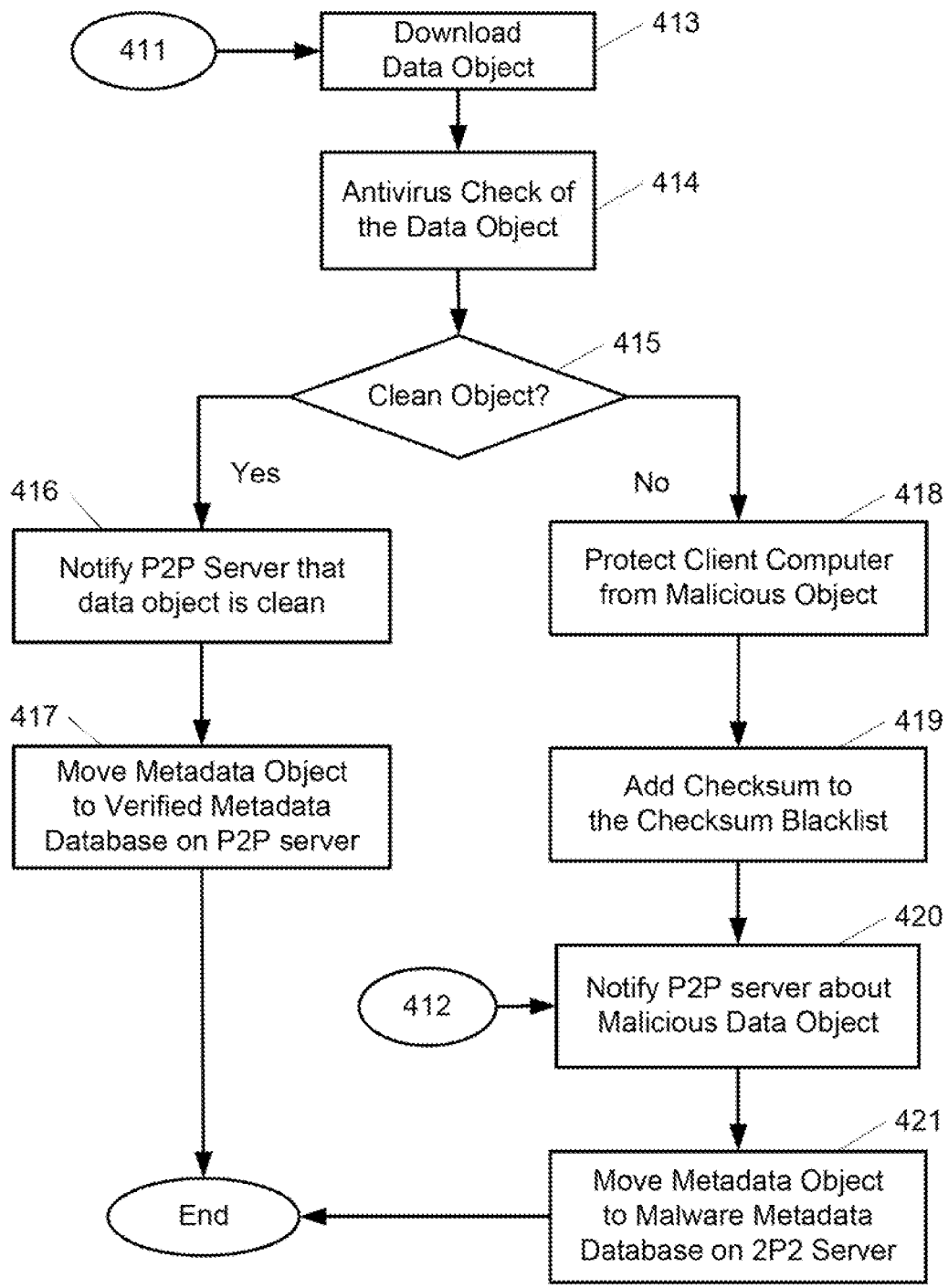

FIG. 4 shows an example method of detection of malware in a P2P network. At step 401, a client computer requests a metadata object associated with a data object that client computer wants to download from another client computer in the P2P network. The P2P server 200 receives the request and processes it by the control module 201 in step 402. The control module 201 first determines if the requested metadata object is found in the verified metadata database 203 or unverified metadata database 202. If at step 403, the control module 201 determines that the requested metadata object is found in the verified metadata database 203, which means the associated data object is clean, the metadata object is returned in step 404 to the client computer that requested and the process ends. If at step 403, the control module 201 determines that the requested metadata object is stored in the unverified metadata database 202, which means that the associated data object has not been tested for presence of malware, the control module 201 checks, at step 406, if the client computer that requested the metadata objects has a malware detection system 100 or another antivirus software deployed thereon. If the unverified metadata object has been requested by a client computer that does not have a malware detection system 100 or another antivirus software deployed thereon, such as client computer 305, the control module 201 does not return the requested metadata object to that client computer and process ends. On the other hand, if the unverified metadata object was requested by a client computer that does have a malware detection system 100 or another antivirus software deployed thereon, such as client computer 302, then control module 201 retrieves and returns to the client computer the requested metadata object at step 409, provided that the client computer first updates its checksum blacklist 104 and antivirus database 107 at step 408 according to one example embodiment.

On the client computer, upon receipt of a metadata object 102 form the P2P server 200 through client module 101, the checksum verification module 103 extracts from the downloaded metadata object 102 a checksum of the associated data object 105 and verifies at step 410 if the extracted checksum is found in the checksum blacklist 104. If the checksum verification module 103 finds the checksum in the checksum blacklist 104, then the checksum verification module 103 may prohibit, at step 412, the client module 101 from downloading the associated data object from the P2P network. In this case, at step 420, the client module 101 may inform the P2P server 200 that the requested data object is malicious, and control module 201 moves the associated metadata object to the malware metadata database 205, which will prevent further distribution of the malicious data object on the P2P network.

However, if the extracted checksum was not found in the checksum blacklist 104 at step 411, then checksum verification module 103 authorizes, at step 413, the peer client module 101 to download from the P2P network data object 105 associated with the previously downloaded metadata object 102. Although the object's checksum was not found in the checksum blacklist 104, it does not necessarily mean the downloaded object is clean, therefore at step 414, the downloaded data object 105 is passed to the antivirus engine 106, which performs antivirus check using updated antivirus database 107. If it is determined at step 415 that the downloaded data object 105 is clean, the client component 101 may notify the P2P network server 200, at step 416, that the downloaded object 105 is clean. Once the control module 201 of the P2P server 200 receives this notification from the client computer it may move the associated metadata object from the unverified metadata database 202 to the verified metadata database 203 at step 417. The process then ends.

If it is, however, determined at step 415 that the downloaded data object 105 contains malware, the antivirus engine 106 performs various actions to protect the client computer system at step 418. These actions may depend on the degree of risk associated with the malicious object 105, and may include, but not limited to, quarantining the object, deleting the object from the client computer, etc. In addition, antivirus engine 106 informs the checksum verification module 103 that the checksum of the malicious object 105 should be added to the checksum blacklist 104 at step 419. In addition, the update module 109 may send information about updated checksum blacklist to the central antivirus server. Next, at step 420, the peer client module 101 will send to the P2P network server 200 information about new malicious object 105. So that at step 421, the control module may move metadata object associated with the newly detected malware to the malware metadata database 205, which will prevent further distribution of the associated malicious data object in the P2P network.

Figure 5:
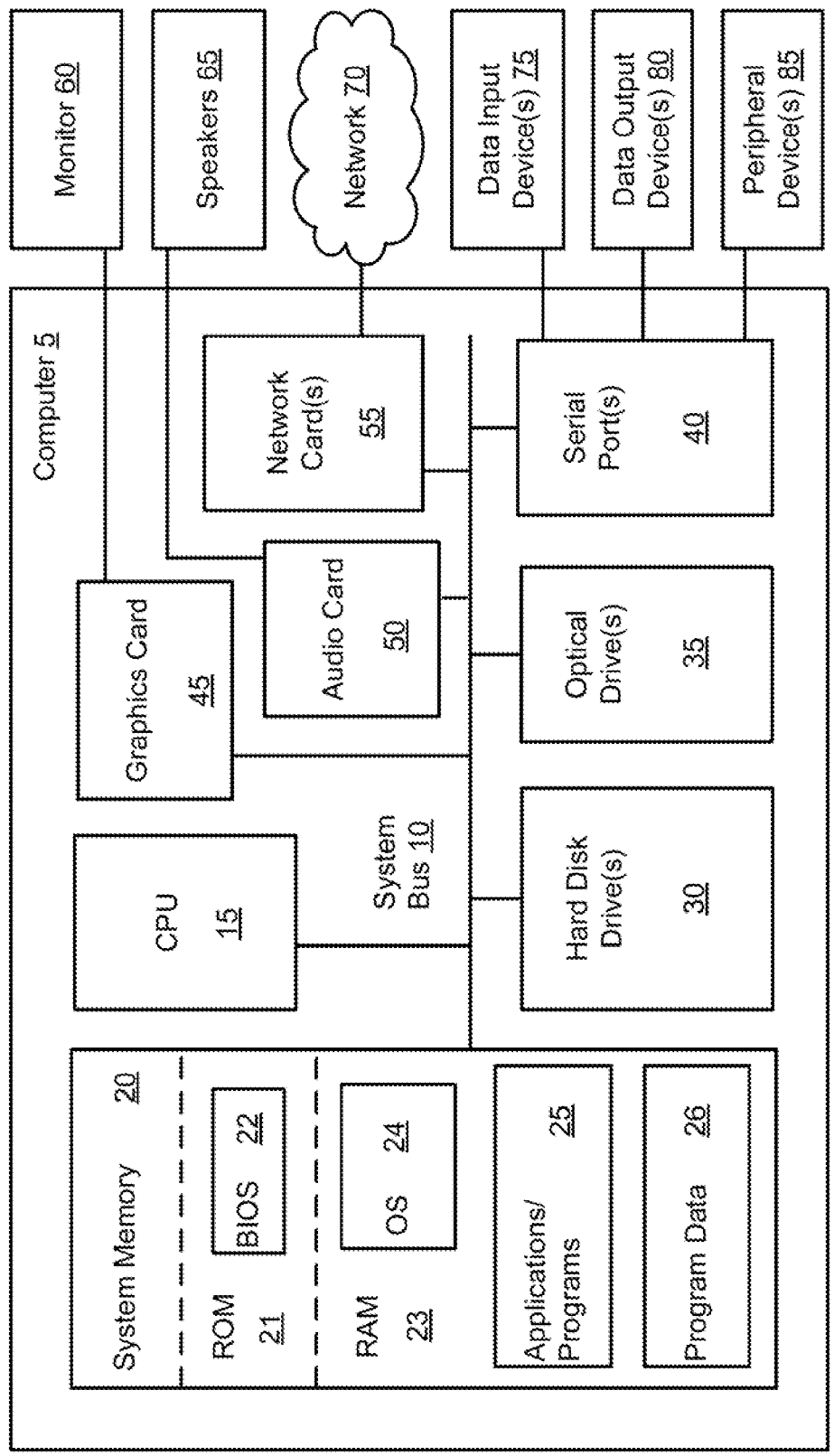
FIG. 5 shows an example of a general purpose computer system that can be used to implement components of the systems for detection of malware in a P2P network.

FIG. 5 depicts one example embodiment of a computer system 5, such as a network server, suitable for implementing the network security system of the present invention, as well as other computing devices that may be utilizing services of the security system, including but not limited to personal computers and servers running security applications, mobile communication devices, network servers, and other devices. As shown, computer 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional® or other type of operating system, that is responsible for management and coordination of processes and allocation and sharing of hardware resources in computer system 5. System memory 20 also stores applications and programs 25, such as security applications, that are running on the computer system 5. System memory 20 also stores various runtime data 26 used by programs 25.

Computer system 5 may further include hard disk drive(s) 30, such as 1 terabyte SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer 5 employs magnetic and optical disks, it should be appreciated by those skilled in the art that other types of computer readable media that can store data accessible by the computer system 5, such as magnetic cassettes, flash memory cards, digital video disks, RAMs, ROMs, EPROMs and other types of memory may also be used in alternative embodiments of the computer 5.

Computer 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the implementations of the invention are shown and described herein. It will be appreciated that in the development of any such actual implementation, numerous implementation-specific decisions must be made in order to achieve the developer's specific goals, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for preventing spread of malware in a peer-to-peer (P2P) network, the method comprising:
   maintaining, by a server, a database of verified clean metadata objects, a database of verified malicious metadata objects, and a database of unverified metadata objects;
   receiving, by the server, from a peer client computer on the P2P network a request for a metadata object, containing information about an associated data object;
   checking, by a hardware processor of the server, if the requested metadata object is found in one of the database of verified clean metadata objects, the database of verified malicious metadata objects and the database of unverified metadata objects;
   if the requested metadata object is found in the database of verified clean data objects, transmitting, by the server, the requested metadata object to the peer client computer;
   if the requested metadata object is found in the database of unverified data objects, determining, by the hardware processor, if the peer client computer has an antivirus software for testing the unverified data object for malware when the data object is downloaded from the P2P network;
   if the peer client computer has an antivirus software, transmitting, by the server, to the peer client computer the requested metadata object; and
   if the peer client computer does not have an antivirus software, denying the request to provide the metadata object to the peer client computer.

2. The method of claim 1, further comprising:
   if the requested metadata object is found in the database of verified malicious data objects, denying the request to provide the metadata object to the peer client computer.

3. The method of claim 1, wherein determining if the peer client computer has an antivirus software for testing the unverified data object for malware when the data object is downloaded from the P2P network further includes:
   determining if the antivirus software of the peer client computer is updated; and
   updating the antivirus software of the peer client software before transmitting to the peer client computer the requested metadata object.

4. The method of claim 1, wherein the metadata object includes a checksum of the associated data object, and wherein the checksum is used by the client peer computer to verify whether the associated data object is clean or malicious using a checksum blacklist.

5. The method of claim 1, wherein transmitting to the peer client computer the requested metadata object further includes:
   instructing the antivirus software of the peer client computer to test the unverified data object for malware when the data object is downloaded from the P2P network; and
   instructing the peer client computer to report back results of the malware test.

6. The method of claim 5, wherein, if the unverified data object is determined to be malicious, computing a checksum of the data object and storing the computed checksum in the checksum blacklist on the peer client computer.

7. A system for preventing spread of malware in a peer-to-peer (P2P) network, the system comprising a P2P server having a hardware processor configured to at least:
   maintaining a database of verified clean metadata objects, a database of verified malicious metadata objects, and a database of unverified metadata objects;
   receive from a peer client computer on the P2P network a request for a metadata object containing information about an associated data object;
   check, if the requested metadata object is found in one of the database of verified clean metadata objects, the database of verified malicious metadata objects and the database of unverified metadata objects;
   if the requested metadata object is found in the database of verified clean data objects, transmit the requested metadata object to the peer client computer;
   if the requested metadata object is found in the database of unverified data objects, determine if the peer client computer has an antivirus software for testing the unverified data object for malware when the data object is downloaded from the P2P network;
   if the peer client computer has an antivirus software, transmit to the peer client computer the requested metadata object; and
   if the peer client computer does not have an antivirus software, deny the request to provide the metadata object to the peer client computer.

8. The system of claim 7, wherein the P2P server further configured to: if the requested metadata object is found in the database of verified malicious data objects, deny the request to provide the metadata object to the peer client computer.

9. The system of claim 7, wherein to determine if the peer client computer has an antivirus software for testing the unverified data object for malware when the data object is downloaded from the P2P network, the P2P server further configured to:
   determine if the antivirus software of the peer client computer is updated; and
   update the antivirus software of the peer client software before transmitting to the peer client computer the requested metadata object.

10. The system of claim 7, wherein the metadata object includes a checksum of the associated data object, and wherein the checksum is used by the client peer computer to verify whether the associated data object is clean or malicious using a checksum blacklist.

11. The system of claim 7, wherein to transmit to the peer client computer the requested metadata object, the P2P server further configured to:

instruct the antivirus software of the peer client computer to test the unverified data object for malware when the data object is downloaded from the P2P network; and instruct the peer client computer to report back results of the malware test to the P2P server.

12. The system of claim 11, wherein, if the unverified data object is determined to be malicious, the P2P server is configured to compute a checksum of the data object and store the computed checksum in the checksum blacklist on the peer client computer.

13. A non-transitory computer-readable storage medium comprising computer-executable instructions for preventing spread of malware in a peer-to-peer (P2P) network, including the instructions for:

maintaining, by a server, a database of verified clean metadata objects, a database of verified malicious metadata objects, and a database of unverified metadata objects;

receiving from a peer client computer on the P2P network a request for a metadata object containing information about an associated data object;

checking if the requested metadata object is found in one of the database of verified clean metadata objects, the database of verified malicious metadata objects and the database of unverified metadata objects;

if the requested metadata object is found in the database of verified clean data objects, transmitting the requested metadata object to the peer client computer;

if the requested metadata object is found in the database of unverified data objects, determining if the peer client computer has an antivirus software for testing the unverified data object for malware when the data object is downloaded from the P2P network;

if the peer client computer has an antivirus software, transmitting to the peer client computer the requested metadata object; and if the peer client computer does not have an antivirus software, denying the request to provide the metadata object to the peer client computer.

14. The non-transitory computer-readable storage medium of claim 13, further comprising instructions for:

if the requested metadata object is found in the database of verified malicious data objects, denying request to provide the metadata object to the peer client computer.

15. The non-transitory computer-readable storage medium of claim 13, wherein instructions for determining if the peer client computer has an antivirus software for testing the unverified data object for malware when the data object is downloaded from the P2P network further include instructions for:

determining if the antivirus software of the peer client computer is updated; and updating the antivirus software of the peer client software before transmitting to the peer client computer the requested metadata object.

16. The non-transitory computer-readable storage medium of claim 13, wherein the metadata object includes a checksum of the associated data object, and wherein the checksum is used by the client peer computer to verify whether the associated data object is clean or malicious using a checksum blacklist.

17. The non-transitory computer-readable storage medium of claim 13, wherein instructions for transmitting to the peer client computer the requested metadata object further include instructions for:

instructing the antivirus software of the peer client computer to test the unverified data object for malware when the data object is downloaded from the P2P network; and instructing the peer client computer to report back results of the malware test.

18. The non-transitory computer-readable storage medium of claim 17, further comprising instructions for, if the unverified data object is determined to be malicious, computing a checksum of the data object and storing the computed checksum in the checksum blacklist on the peer client computer.

* * * * *